US008521341B2

(12) United States Patent
Brotherton

(10) Patent No.: US 8,521,341 B2
(45) Date of Patent: Aug. 27, 2013

(54) METHODS AND SYSTEMS FOR FAULT DETERMINATION FOR AIRCRAFT

(75) Inventor: Tom Brotherton, Poway, CA (US)

(73) Assignee: Honeywell International Inc., Morristown, NJ (US)

( * ) Notice: Subject to any disclaimer, the term of this patent is extended or adjusted under 35 U.S.C. 154(b) by 732 days.

(21) Appl. No.: 12/492,944

(22) Filed: Jun. 26, 2009

(65) Prior Publication Data
US 2010/0332053 A1 Dec. 30, 2010

(51) Int. Cl.
*G01C 23/00* (2006.01)

(52) U.S. Cl.
USPC ............................................................ 701/3

(58) Field of Classification Search
USPC ............ 701/3–4, 10–11, 14, 29.1, 29.2, 29.9, 701/30, 2, 31, 5, 7, 31.9, 32.4, 32, 32.9, 33.4, 701/415, 424, 439, 528
See application file for complete search history.

(56) References Cited

U.S. PATENT DOCUMENTS

| 3,678,256 | A | * | 7/1972 | Harenberg, Jr. ................. 701/16 |
| 4,092,716 | A | | 5/1978 | Berg et al. |
| 5,710,559 | A | | 1/1998 | Krogmann |
| 5,713,007 | A | | 1/1998 | Lecomte et al. |
| 6,085,127 | A | | 7/2000 | Vos |
| 6,304,194 | B1 | | 10/2001 | McKillip |
| 7,177,734 | B2 | | 2/2007 | Fossen et al. |
| 7,272,473 | B2 | | 9/2007 | Hiltner et al. |
| 7,289,906 | B2 | | 10/2007 | van der Merwe et al. |
| 7,292,954 | B2 | | 11/2007 | Deller et al. |
| 7,373,227 | B2 | | 5/2008 | Lu et al. |
| 2002/0193920 | A1 | | 12/2002 | Miller et al. |
| 2005/0114090 | A1 | | 5/2005 | Black et al. |
| 2006/0043242 | A1 | | 3/2006 | Benson |
| 2007/0208465 | A1 | * | 9/2007 | Gremmert ........................ 701/4 |
| 2008/0040152 | A1 | | 2/2008 | Vian et al. |
| 2008/0165018 | A1 | | 7/2008 | Breed |
| 2009/0030612 | A1 | | 1/2009 | Hayashi et al. |
| 2009/0048689 | A1 | | 2/2009 | Pelton et al. |

OTHER PUBLICATIONS

Samar, S.: "Embedded Estimation of Fault Parameters in an Unmanned Aerial Vehicle" Proceedings of the 2006 IEEE, International Conference on Control Applications, Munich, Germany, Oct. 4-6, 2006, pp. 3265-3270, XP03142057.
EP Search Report for application No. 10 166 850.7 dated Sep. 3, 2012.
EP Communication for application No. 10 166 850.7 dated Sep. 14, 2012.

* cited by examiner

*Primary Examiner* — Kim T Nguyen
(74) *Attorney, Agent, or Firm* — Ingrassia Fisher & Lorenz, P.C.

(57) ABSTRACT

A method for fault determination for an aircraft includes the steps of generating a predicted maneuver of the aircraft using an aircraft operating input and a model of aircraft performance, determining an actual maneuver of the aircraft using information obtained from an inertial measurement system, comparing the predicted maneuver and the actual maneuver, and determining a fault of the aircraft based on the comparison of the predicted maneuver and the actual maneuver.

20 Claims, 2 Drawing Sheets

METHODS AND SYSTEMS FOR FAULT DETERMINATION FOR AIRCRAFT

TECHNICAL FIELD

The present invention generally relates to the field of aircraft and, more specifically, to methods and systems for determination faults for aircraft.

BACKGROUND OF THE INVENTION

Aircraft often have a health monitoring system to assist in determining faults in the aircraft. A health monitoring system may collect various aircraft data for any irregularities or other signs of a fault or problem with the aircraft. While health monitoring systems for aircraft generally perform well in detecting certain faults, it may be desired to further improve health monitoring systems and methods for determining faults in aircraft, for example that further improve accuracy and/or speed of the fault determinations.

Accordingly, it is desirable to provide an improved method for determining faults in aircraft, for example that potentially further improves accuracy and/or speed of the fault determinations. It is also desirable to provide an improved program product for such determining of faults in aircraft. It is further desirable to provide an improved system for such determining of faults in aircraft. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, a method for fault determination for an aircraft is provided. The method comprises the steps of generating a predicted maneuver of the aircraft using an aircraft operating input and a model of aircraft performance, determining an actual maneuver of the aircraft using information obtained from an inertial measurement system, comparing the predicted maneuver and the actual maneuver, and determining a fault of the aircraft based on the comparison of the predicted maneuver and the actual maneuver.

In accordance with another exemplary embodiment of the present invention, a program product for fault determination for an aircraft is provided. The program product comprises a program and a computer readable signal bearing medium. The program is configured to at least facilitate generating a predicted maneuver of the aircraft using an aircraft operating input and a model of aircraft performance, determining an actual maneuver of the aircraft using information obtained from an inertial measurement system, comparing the predicted maneuver and the actual maneuver, and determining a fault of the aircraft based on the comparison of the predicted maneuver and the actual maneuver. The computer-readable signal bearing medium bears the program.

In accordance with a further exemplary embodiment of the present invention, a system for fault determination for an aircraft is provided. The system comprises an inertial measurement system and a processor. The inertial measurement system is configured to at least facilitate obtaining information pertaining to an actual maneuver of the aircraft. The processor is coupled to the inertial measurement system, and is configured to at least facilitate generating a predicted maneuver of the aircraft using an aircraft operating input and a model of aircraft performance, determining the actual maneuver of the aircraft using the information obtained by the inertial measurement system, comparing the predicted maneuver and the actual maneuver, and determining a fault of the aircraft based on the comparison of the predicted maneuver and the actual maneuver.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
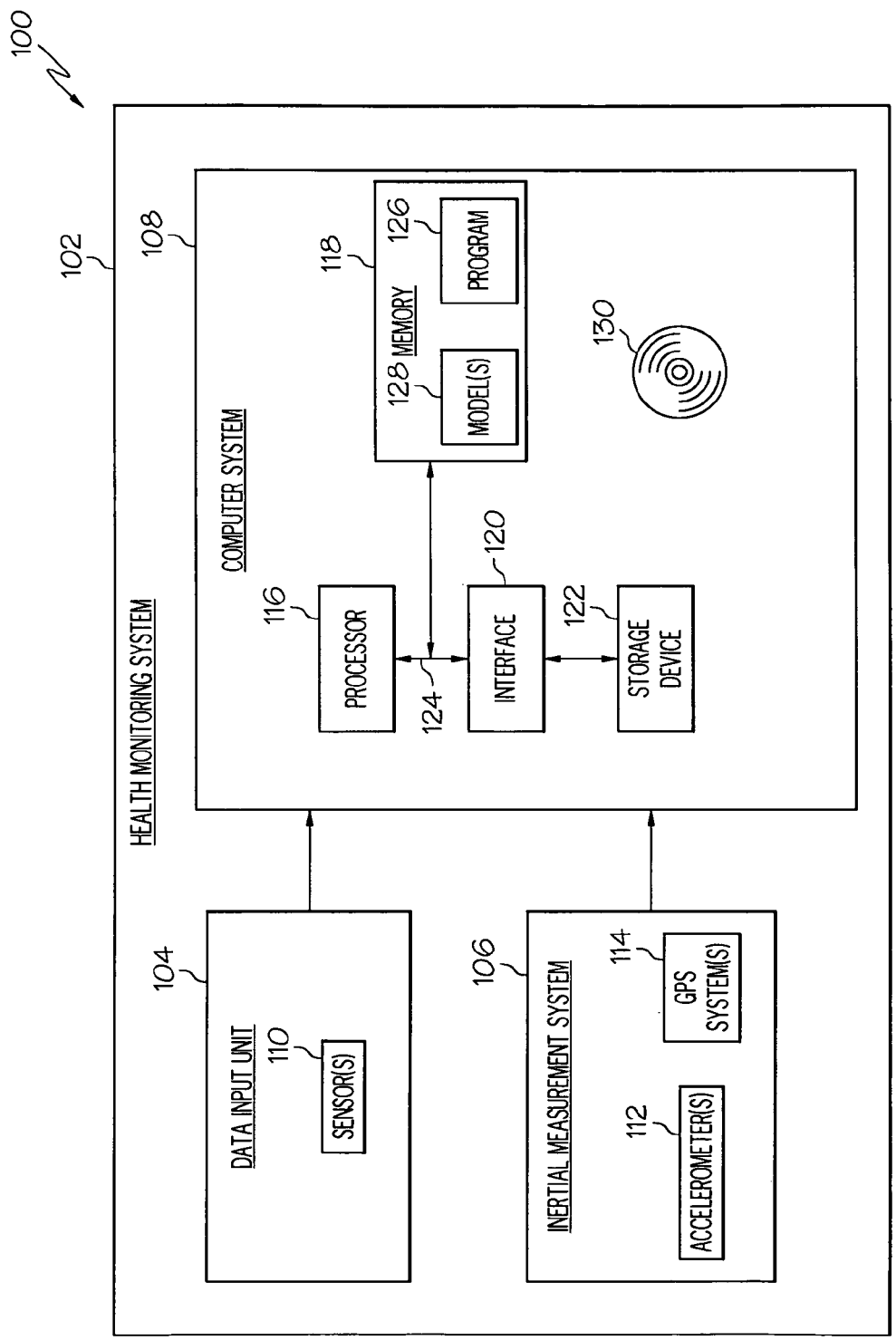
FIG. 1 is a functional block diagram of a health monitoring system for an aircraft, in accordance with an exemplary embodiment of the present invention.

FIG. 1 is a functional block diagram of a health monitoring system 100 for an aircraft, in accordance with an exemplary embodiment of the present invention. In a preferred embodiment, the health monitoring system 100 is disposed within the aircraft. It will be appreciated that, in various embodiments, the aircraft may comprise any one of a number of different types of airplanes, helicopters, spacecraft, and/or other types of aircraft.

In the depicted embodiment, the health monitoring system 100 comprises a housing 102, a data input unit 104, an inertial measurement system 106, and a computer system 108. The data input unit 104, the inertial measurement system 106, and the computer system 108 are each preferably disposed within the housing 102 and within the aircraft.

The data input unit 104 provides inputs for use by the computer system 108 in providing fault determination for the aircraft. In one preferred embodiment, the data input unit 104 provides control data inputs to the computer system 108 based on actions of a pilot of the aircraft. For example, in certain preferred embodiments, the control data inputs comprise data pertaining to a pilot's engagement of one or more throttles, joysticks, pedals, collective, cyclic, and/or brakes of an aircraft during flight, among other data related to operation and/or control of the aircraft. In another preferred embodiment, for example in which the aircraft comprises an unmanned airplane, the data input unit 104 provides control data inputs to the computer system 108 based on one or more aircraft presets and/or actions of and/or derived inputs from a flight control system of the aircraft.

Also in a preferred embodiment, the data input unit 104 also provides environmental condition data inputs to the computer system 108. For example, in certain preferred embodiments, the environmental condition data inputs comprise information pertaining to outside air temperatures, densities, wind speeds and magnitudes, precipitation, and/or various other data pertaining to environmental conditions surrounding the aircraft during flight.

In addition, in a preferred embodiment, the data input unit 104 also provides aircraft performance data inputs to the computer system 108. For example, in certain preferred embodiments, the aircraft performance data inputs comprise information pertaining to one or more directions, speeds, pitches, accelerations, and/or various other data pertaining to flight performance data and/or related parameters during flight.

In a preferred embodiment, the data input unit 104 conducts these functions in accordance with the steps of the process 200 depicted in FIG. 2 and described further below in connection therewith. Also in a preferred embodiment, the data input unit 104 comprises one or more sensors 110, as depicted in FIG. 1. For example, in certain preferred embodiments, the data input unit 104 includes certain sensor(s) 110 for obtaining the control data inputs and/or information pertaining thereto, various other sensors(s) 110 for obtaining the environmental condition data inputs and/or information pertaining thereto, and yet additional sensor(s) 110 for obtaining the aircraft performance data inputs and/or information pertaining thereto.

The inertial measurement system 106 obtains measurements regarding movement of the aircraft. The inertial measurement system 106 provides these measurements and/or information pertaining thereto to the computer system 108 for processing and for use by the computer system 108 in determining faults for the aircraft. In a preferred embodiment, the inertial measurement system 106 obtains measurements and/or related information pertaining to magnitudes and directions of movement of the aircraft, for example during aircraft turns, accelerations, decelerations, increases or decreases in pitch, and/or various other aircraft maneuvers that may be dependent upon or influenced by pilot controls for the aircraft, controls or inputs by or for a flight control system of an aircraft, environmental conditions surrounding the aircraft, and/or aircraft performance parameters during flight.

In a preferred embodiment, the inertial measurement system 106 conducts these functions in accordance with the steps of the process 200 depicted in FIG. 2 and described further below in connection therewith. In addition, in a preferred embodiment, the inertial measurement system 106 includes and/or is coupled to one or more global positioning system 114 and/or components thereof. Also in a preferred embodiment, the inertial measurement system 106 also includes one or more accelerometers 112 for the aircraft.

The computer system 108 is coupled to the data input unit 104 and the inertial measurement system 106. In a preferred embodiment, the computer system 108 obtains and processes the control data inputs, the environmental condition data inputs, and the aircraft performance data inputs provided by the data input unit 104 along with the measurements regarding movements of the aircraft. The computer system 108 determines faults for the aircraft utilizing these inputs and measurements.

Specifically, in accordance with a preferred embodiment, the computer system 108 provides the control data inputs, the environmental condition data inputs, and the aircraft performance data inputs from the data input unit 104 into one or more models of aircraft performance, such as the model 128 depicted in FIG. 1 and described further below, to generate predicted aircraft maneuvers. The computer system 108 also determines actual aircraft maneuvers using the measurements regarding movements of the aircraft from the inertial measurement system 106. In addition, the computer system 108 compares the predicted aircraft maneuvers with the actual aircraft maneuvers, and determines faults, if any, for the aircraft based on this comparison. In a preferred embodiment, the computer system 108 performs these functions in accordance with the steps of the process 200 depicted in FIG. 2 and described further below in connection therewith.

In the embodiment depicted in FIG. 1, the computer system 112 includes a processor 116, a memory 118, an interface 120, a storage device 122, and a bus 124. The processor 116 performs the computation and control functions of the computer system 112, and may comprise any type of processor or multiple processors, single integrated circuits such as a microprocessor, or any suitable number of integrated circuit devices and/or circuit boards working in cooperation to accomplish the functions of a processing unit. During operation, the processor 116 executes one or more programs 126 contained within the memory 118 and, as such, controls the general operation of the computer system 112. In a preferred embodiment, the processor 116 conducts these functions in accordance with the steps of the process 200 depicted in FIG. 2 and described further below in connection therewith.

The memory 118 can be any type of suitable memory. This would include the various types of dynamic random access memory (DRAM) such as SDRAM, the various types of static RAM (SRAM), and the various types of non-volatile memory (PROM, EPROM, and flash). The bus 124 serves to transmit programs, data, status and other information or signals between the various components of the computer system 112. In a preferred embodiment, the memory 118 stores the above-referenced program 126 along with one or more models 128 of aircraft performance that are used in determining faults for the aircraft in accordance with the steps of the process 200 depicted in FIG. 2 and described further below in connection therewith.

The interface 120 allows communication to the computer system 112, for example from a system driver and/or another computer system, and can be implemented using any suitable method and apparatus. It can include one or more network interfaces to communicate with other systems or components. The interface 120 may also include one or more network interfaces to communicate with technicians, and/or one or more storage interfaces to connect to storage apparatuses, such as the storage device 122.

The storage device 122 can be any suitable type of storage apparatus, including direct access storage devices such as hard disk drives, flash systems, floppy disk drives and optical disk drives, such as one or more disks 130 and/or drives therefor. In one exemplary embodiment, the storage device 122 comprises a program product from which memory 118 can receive a program 126 that executes one or more embodiments of one or more processes of the present invention, such as the process 200 of FIG. 2 or portions thereof. In another exemplary embodiment, the program product may be directly stored in and/or otherwise accessed by the memory 118 and/or a disk such as that referenced below.

The bus 124 can be any suitable physical or logical means of connecting computer systems and components. This includes, but is not limited to, direct hard-wired connections, fiber optics, infrared and wireless bus technologies. During operation, the program 126 is stored in the memory 118 and executed by the processor 116.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system 112 may also otherwise differ from the embodiment depicted in FIG. 1, for example in that the computer system 112 may be coupled to or may otherwise utilize one or more remote computer systems and/or other control systems.

Figure 2:
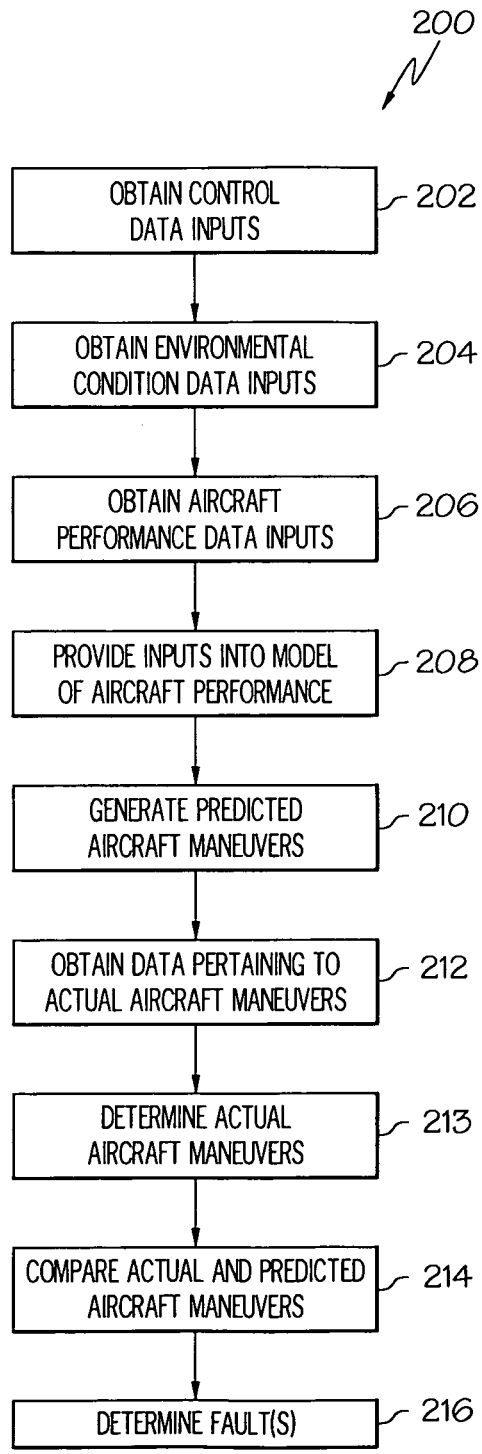
FIG. 2 is a flowchart of a process for determining faults for an aircraft, and that can be utilized in connection with the health monitoring system of FIG. 1, in accordance with an exemplary embodiment of the present invention.

FIG. 2 is a flowchart of a process 200 for determining faults for an aircraft, in accordance with an exemplary embodiment of the present invention. The process 200 can be implemented in connection with the health monitoring system 100 of FIG. 1, the computer system 112 of FIG. 1, and/or program products utilized therewith, in accordance with an exemplary embodiment of the present invention.

As depicted in FIG. 2, the process 200 begins with the step of obtaining control data inputs for the aircraft (step 202). In one preferred embodiment, the control data inputs comprise data pertaining to a pilot's engagement of one or more throttles, joysticks, pedals, collective, cyclic, and/or brakes of an aircraft during flight, among other data related to operation and/or control of the aircraft. In another preferred embodiment, for example in which the aircraft comprises an unmanned airplane, the control data inputs comprise one or more aircraft presets and/or actions of and/or derived inputs from a flight control system of the aircraft. In certain preferred embodiments, the control data inputs are obtained by the data input unit 104 of FIG. 1 and provided to the processor 116 of the computer system 108 of FIG. 1 during flight of the aircraft.

In addition, environmental condition data inputs are obtained (step 204). In a preferred embodiment, the environmental condition data inputs comprise data pertaining to outside air temperatures, densities, wind speeds and magnitudes, precipitation, and/or various other data pertaining to environmental conditions surrounding the aircraft during flight. Also in a preferred embodiment, the environmental condition data inputs are obtained by the data input unit 104 of FIG. 1 and provided to the processor 116 of the computer system 108 of FIG. 1 during flight of the aircraft.

Aircraft performance data inputs are also obtained (step 206). In a preferred embodiment, the aircraft performance data inputs comprise data pertaining to one or more directions, speeds, pitches, accelerations, and/or various other data pertaining to flight performance data and/or related parameters during flight. Also in a preferred embodiment, the aircraft performance data inputs are obtained by the data input unit 104 of FIG. 1 and provided to the processor 116 of the computer system 108 of FIG. 1 during flight of the aircraft.

The inputs are then provided into a model of aircraft performance (step 208). Specifically, in a preferred embodiment, the control data inputs, the environmental condition data inputs, and the aircraft performance data inputs are all used as inputs by the processor 116 of the computer system 108 of FIG. 1 in running a model of aircraft performance during flight of the aircraft. Also in a preferred embodiment, the aircraft performance model comprises a physics-based model of aircraft performance, and is stored in the memory 118 of the computer system 108 as the model 128 of FIG. 1. It will be appreciated that any one or more of a number of different performance models may be utilized in various embodiments. In addition, in certain embodiments, the use of the inputs in step 208 may vary, and/or additional inputs may also be used in certain embodiments.

Predicted aircraft maneuvers are then generated (step 210). In a preferred embodiment, the predicted aircraft maneuvers are generated in step 210 by the processor 116 of the computer system 108 based on outputs from the running of the model of aircraft performance in step 208 using the various control data inputs, the environmental condition data inputs, and the aircraft performance data inputs during flight of the aircraft. Also in a preferred embodiment, the predicted maneuvers may comprise any number of different types of turns, braking events, increases or decreases in speed, acceleration, and/or pitch, and/or any number of other different types of aircraft maneuvers in various different embodiments.

In addition, data pertaining to actual maneuvers of the aircraft is obtained (step 212). In a preferred embodiment, the data pertaining to the actual maneuvers of the aircraft is obtained by the inertial measurement system 106 of FIG. 1 and provided to the processor 116 of the computer system 108 of FIG. 1 during flight of the aircraft reflecting a common and identical time period as the inputs obtained during steps 202-206 above. Also in a preferred embodiment, the actual maneuvers may comprise any number of different types of turns, braking events, increases or decreases in speed, acceleration, and/or pitch, and/or any number of other different types of aircraft maneuvers in various different embodiments.

The actual maneuvers of the aircraft are then determined (step 213). In a preferred embodiment, the actual maneuvers of the aircraft are determined by the processor 116 of the computer system 108 of FIG. 1 during flight of the aircraft using the data and/or measurements obtained from the inertial measurement system 106 of FIG. 1 during the above-described step 212, and represent actual maneuvers of the aircraft during the same time period during flight as the time period during flight represented by the predicted maneuvers of the aircraft generated in step 210 above.

The actual and predicted maneuvers of the aircraft are then compared with one another (step 214). In a preferred embodiment, the actual aircraft maneuvers determined in step 213 are compared with the predicted aircraft maneuvers generated in step 210 by the processor 116 of the computer system 108 of FIG. 1, to thereby generate this comparison.

One or more faults, if any, are then determined for the aircraft (step 216). In a preferred embodiment, the faults are determined by the processor 116 of the computer system 108 based on the comparison of the actual and predicted maneuvers of the aircraft of step 214.

In various embodiments different techniques may be utilized in the fault determination of step 216. For example, in one preferred embodiment, historical data examples may be utilized in determining the faults, for example in relating the pattern matching comparison of the actual and predicted maneuvers of the aircraft of step 214 with known results of such comparisons as correlated with different aircraft faults in the historical data. Case-based approaches may similarly be utilized.

In other exemplary embodiments, the model of aircraft performance may be re-run utilizing new inputs in light of the comparison of the actual and predicted maneuvers of the aircraft of step 214 in order to determine the faults. In yet other exemplary embodiments, a rule-based approach may be utilize, for example incorporating rules ascertained in prior experiments or published in prior publications. In other exemplary embodiments, a Bayesian network may be utilized along with the comparison of the actual and predicted maneuvers of the aircraft of step 214 in determining the faults of the aircraft. Also, in other exemplary embodiments, a neural network may be utilized along with the comparison of the actual and predicted maneuvers of the aircraft of step 214 in determining the faults of the aircraft. In addition, in other exemplary embodiments, pattern matching may be utilized along with the comparison of the actual and predicted maneuvers of the aircraft of step 214 in determining the faults of the aircraft. In various other embodiments, a predicted maneuver used classification may be utilized along with the comparison of the actual and predicted maneuvers of the aircraft of step 214 in determining the faults of the aircraft. In other embodiments, a case based approach may be utilized along with the comparison of the actual and predicted maneuvers of the aircraft of step 214 in determining the faults of the aircraft. Also, in other embodiments, a knowledge based approach may be utilized along with the comparison of the actual and predicted maneuvers of the aircraft of step 214 in determining the faults of the aircraft. In still other embodiments, any one or more of a number of classification tools may be utilized along with the comparison of the actual and predicted maneuvers of the aircraft of step 214 in determining the faults of the aircraft. In various other embodiments, various combinations of these and/or other approaches may also be utilized along with the comparison of the actual and predicted maneuvers of the aircraft of step 214 in determining the faults of the aircraft.

Accordingly, improved methods, program products, and systems are provided for determining faults for aircraft. The improved methods, program products, and systems (i) generate predicted aircraft maneuvers using control data information as inputs in a model of aircraft performance, (ii) obtain actual aircraft maneuvers using measurements and data obtained from an inertial measurement system, (iii) compare the actual and predicted aircraft maneuvers; and (iv) determine faults, if any, for the aircraft using this comparison. As discussed above, in certain embodiments, additional inputs, such as environmental condition data inputs and/or aircraft performance data inputs, may also be utilized. Also as discussed above, in certain embodiments, various other techniques may also be utilized in conjunction with the comparison of the actual and predicted aircraft maneuvers in determining the faults for the aircraft.

The methods, program products, and systems provide for enhanced determination of faults in aircraft. For example, by using the control data inputs and other inputs in conjunction with the inertial measurement system measurements and data and the model of aircraft performance, the resulting comparison between the actual aircraft maneuvers and the predicted aircraft maneuvers provides a new and unique tool for determining faults as reflected in the operation of the aircraft. This may result in increased accuracy and precision of the fault determinations. In addition, as these methods, program products, and systems can be used onboard the aircraft during flight and are preferably integrated together on the aircraft, this may also result in faster and more reliable determination of aircraft faults.

It will be appreciated that the disclosed methods, program products, and systems may vary from those depicted in the Figures and described herein. It will similarly be appreciated that certain steps of the process 200 may occur simultaneously or in a different order than that depicted in FIG. 2 and/or described herein in connection therewith. It will similarly be appreciated that the disclosed methods and systems may be implemented and/or utilized in connection with any number of different types of airplanes, helicopters, spacecraft, and/or other different types of aircraft in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.a

I claim:

1. A method for fault determination for an aircraft, the method comprising the steps of:
generating a predicted maneuver for a non-landing component of flight of the aircraft using an aircraft operating input and a model of aircraft performance;
determining an actual maneuver of the aircraft using information obtained from an inertial measurement system;
comparing the predicted maneuver and the actual maneuver; and
determining a fault of the aircraft based on the comparison of the predicted maneuver and the actual maneuver.

2. The method of claim 1, wherein the input is selecting from the group consisting of: a control input based on an action of a pilot of the aircraft, a control system input from a flight control system of the aircraft, or both during an aircraft maneuver during flight.

3. The method of claim 2, wherein the input further comprises environmental data pertaining to environmental conditions surrounding the aircraft during flight.

4. The method of claim 3, wherein the input further comprises performance data pertaining to aircraft performance values of the aircraft during flight.

5. The method of claim 1, wherein the step of determining the fault comprises the step of determining the fault of the aircraft based on the comparison of the predicted maneuver and the actual maneuver and historical data.

6. The method of claim 1, wherein the step of determining the fault comprises the step of determining the fault of the aircraft based on one or more of the following: a predicted maneuver used classification, the comparison of the predicted maneuver and a Bayesian network, a neural network, a case based approach; a knowledge based approach, a classification tool, or any combination thereof.

7. A program product for fault determination for an aircraft, the program product comprising:
a program configured to at least facilitate:
generating a predicted maneuver of the aircraft using an aircraft operating input and a model of aircraft performance;
determining an actual maneuver of the aircraft using information provided by an inertial measurement system;
comparing the predicted maneuver and the actual maneuver; and
determining a fault of the aircraft based on the comparison of the predicted maneuver and the actual maneuver; and
a non-transitory, wholly contained, computer-readable medium bearing the program and disposed onboard the aircraft.

8. The program product of claim 7, wherein the input comprises a control input based on an action of a pilot of the aircraft, a control system input from a flight control system of the aircraft, or both, during a non-landing component of flight of the aircraft.

9. The program product of claim 8, wherein the input further comprises environmental data pertaining to environmental conditions surrounding the aircraft during flight.

10. The program product of claim 9, wherein the input further comprises performance data pertaining to aircraft performance values of the aircraft during flight.

11. The program product of claim 9, wherein the program is further configured to at least facilitate:

determining the fault of the aircraft based on the comparison of the predicted maneuver and the actual maneuver and historical data.

12. A system for determination for an aircraft, the system comprising:
an inertial measurement system disposed within a housing and configured to at least facilitate obtaining information pertaining to an actual maneuver of the aircraft; and
a processor disposed within the housing, the processor coupled to the inertial measurement system and configured to at least facilitate:
generating a predicted maneuver of the aircraft using an aircraft operating input and a model of aircraft performance;
determining the actual maneuver of the aircraft using the information obtained by the inertial measurement system;
comparing the predicted maneuver and the actual maneuver; and
determining a fault of the aircraft based on the comparison of the predicted maneuver and the actual maneuver.

13. The system of claim 12, further comprising:
a plurality of sensors disposed within the housing and configured to obtain the aircraft operating input.

14. The system of claim 13, wherein the processor is further configured to at least facilitate:

determining the fault of the aircraft based on the comparison of the predicted maneuver and the actual maneuver and historical data.

15. The system of claim 13, wherein the inertial measurement system comprises a global positioning system disposed within the housing.

16. The system of claim 15, wherein the inertial measurement system further comprises a plurality of accelerometers disposed within the housing.

17. The system of claim 13, wherein the housing, the inertial measurement system and the processor are each disposed onboard the aircraft.

18. The system of claim 12, wherein the input comprises a control input based on an action of a pilot of the aircraft, a control system input from a flight control system of the aircraft, or both during a non-landing component of flight of the aircraft.

19. The system of claim 18, wherein the input further comprises environmental data pertaining to environmental conditions surrounding the aircraft during flight and performance data pertaining to aircraft performance values of the aircraft during flight.

20. The system of claim 18, wherein the input further comprises data based on a turn of the aircraft during flight.

* * * * *